(12) United States Patent
Ting et al.

(10) Patent No.: US 10,729,278 B2
(45) Date of Patent: Aug. 4, 2020

(54) FLUID POUROVER DEVICE FOR BREWING A BEVERAGE

(71) Applicant: Tsann Kuen (Zhangzhou) Enterprise Co., Ltd., Zhangzhou, Fujian (CN)

(72) Inventors: Yu-Min Ting, Tainan (TW); Kun-Ku Hou, Fujian (CN); Fu Yan, Fujian (CN); Yanxiang Zhang, Fujian (CN)

(73) Assignee: TSANN KUEN (ZHANGZHOU) ENTERPRISE CO., LTD., Zhangzhou, Fujian (CN)

( * ) Notice: Subject to any disclaimer, the term of this patent is extended or adjusted under 35 U.S.C. 154(b) by 241 days.

(21) Appl. No.: 15/837,133

(22) Filed: Dec. 11, 2017

(65) Prior Publication Data

US 2018/0168390 A1    Jun. 21, 2018

(30) Foreign Application Priority Data

Dec. 16, 2016  (CN) .......................... 2016 1 1168765
May 18, 2017   (CN) .......................... 2017 1 0352027

(51) Int. Cl.
*A47J 31/46* (2006.01)
*A47J 31/06* (2006.01)
*A47J 31/44* (2006.01)

(52) U.S. Cl.
CPC ....... *A47J 31/4403* (2013.01); *A47J 31/0636* (2013.01); *A47J 31/4475* (2013.01)

(58) Field of Classification Search
CPC ............. A47J 31/46; A47J 31/06; A47J 31/44
See application file for complete search history.

(56) References Cited

U.S. PATENT DOCUMENTS

2014/0020566 A1*  1/2014  Stieger ................. B67D 1/0049
                                                              99/300
2014/0144330 A1*  5/2014  Huang .................... A47J 31/46
                                                              99/300

FOREIGN PATENT DOCUMENTS

CN    201557977 U    8/2010
CN    103829802 A    6/2014

OTHER PUBLICATIONS

Search Report appended to an Office Action, which was issued to Chinese counterpart application No. 201710352027.0 by the CNIPA dated Aug. 16, 2019; pp. 1-6.

* cited by examiner

*Primary Examiner* — Anthony J Weier
(74) *Attorney, Agent, or Firm* — Muncy, Geissler, Olds & Lowe, P.C.

(57) ABSTRACT

A fluid pourover device for brewing a beverage is adapted to deliver a fluid, and includes a driving unit defining a vertical rotating axis, a transmitting shaft extending along a transmitting axis inclined relative to the rotating axis and coupled with the driving unit to be rotated about the rotating axis, a fluid delivering member connected and rotated with the transmitting shaft and having a nozzle assembly to deliver the fluid in a direction of the transmitting axis for forming an inclined fluid delivering path during rotation.

12 Claims, 20 Drawing Sheets

FLUID POUROVER DEVICE FOR BREWING A BEVERAGE

CROSS-REFERENCE TO RELATED APPLICATION

This application claims priority of Chinese Patent Application No. 201611168765.1, filed on Dec. 16, 2016, and Chinese Patent Application No. 201710352027.0, filed on May 18, 2017.

FIELD

The disclosure relates to an equipment and technique for brewing a beverage, such as coffee, and more particularly to a fluid pourover device for brewing a beverage and a fluid pourover method.

BACKGROUND

A variety of brewing systems or beverage making methods have been developed, which utilize a process of distributing a fluid, such as water, over a brewing substance or combining a fluid or other ingredients with beverage producing ingredients. In order to make coffee drinks with a variety of tastes and flavors to suit one's preference, a handmade pour-over coffee drink has become popular, and a preparation method thereof includes manually pouring hot water from a water kettle with a slow and spiral pour to a filter holder over and through coffee grounds to extract the coffee flavors into a cup or vessel. Most of coffee brewing machines deliver water in a constant vertical flow path or in a horizontally moving path, and cannot perform a pourover action like manual brewing.

It is desirable to provide a pourover device for brewing a beverage which can simulate a manual pourover action.

SUMMARY

Therefore, an object of the disclosure is to provide a fluid pourover device for brewing a beverage and a fluid pourover method that can alleviate at least one of the drawbacks of the prior art.

According to the disclosure, the fluid pourover device for brewing a beverage is adapted to deliver a fluid, and includes a driving unit defining a rotating axis that extends in an upright direction, a fluid delivering unit and a fluid supply unit. The fluid delivering unit includes a transmitting shaft which extends along a transmitting axis that is inclined relative to and intersects the rotating axis by an included angle and which is coupled with the driving unit to be rotated about the rotating axis, and a fluid delivering member which is connected with and extends downwardly and along the transmitting axis from the transmitting shaft to terminate at a nozzle forming portion that is normal to the transmitting axis. The nozzle forming portion has a nozzle assembly which is configured to define at least one fluid delivering path of a column of the fluid that is parallel to the transmitting axis and inclined relative to the upright direction. The fluid supply unit is disposed for supplying the fluid to the fluid delivering member.

According to the disclosure, the fluid pourover device for brewing a beverage is adapted to deliver a fluid, and includes a machine frame unit, a driving unit, a fluid delivering unit and a fluid supply unit. The machine frame unit includes a housing which defines an accommodation space therein, and a ring support which is pivotably connected to the housing about a first pivot axis in a left-and-right direction. The driving unit is disposed in the accommodation space and defines a rotating axis that extends in an upright direction. The fluid delivering unit is disposed in the accommodation space, and includes a fluid delivering member which is pivotably connected to the ring support about a second pivot axis in a front-and-rear direction and which has a nozzle assembly for forming at least one column of the fluid, and a transmitting shaft which extends upwardly from the fluid delivering member and along a transmitting axis that is inclined relative to and intersects the rotating axis by an included angle. The transmitting shaft has an upper shaft end which is connected with the driving unit to be driven to rotate about the rotating axis so as to generate a swing movement of the fluid delivering member about the second pivot axis relative to the ring support, and to generate a swing movement of the ring support about the first pivot axis relative to the housing. The fluid supply unit is disposed for supplying the fluid to the fluid delivering member.

According to the disclosure, the fluid pourover method for brewing a beverage includes the steps of:

(a) providing a fluid pourover device which comprises a fluid delivering unit that has a fluid delivering member for pourover of a fluid, a fluid supply unit that supplies the fluid to the fluid delivering member, and a driving unit that drives movement of the fluid delivering unit;

(b) providing the fluid to the fluid pourover device, wherein the fluid supply unit is operated to introduce the fluid to the fluid delivering unit; and (c) operating the fluid pourover device to deliver the fluid, wherein the driving unit is operated to drive a reciprocating rotation of the fluid delivering unit to permit the fluid to be delivered from the fluid delivering member in an inclined direction relative to an upright direction and surround an upright line in the upright direction.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
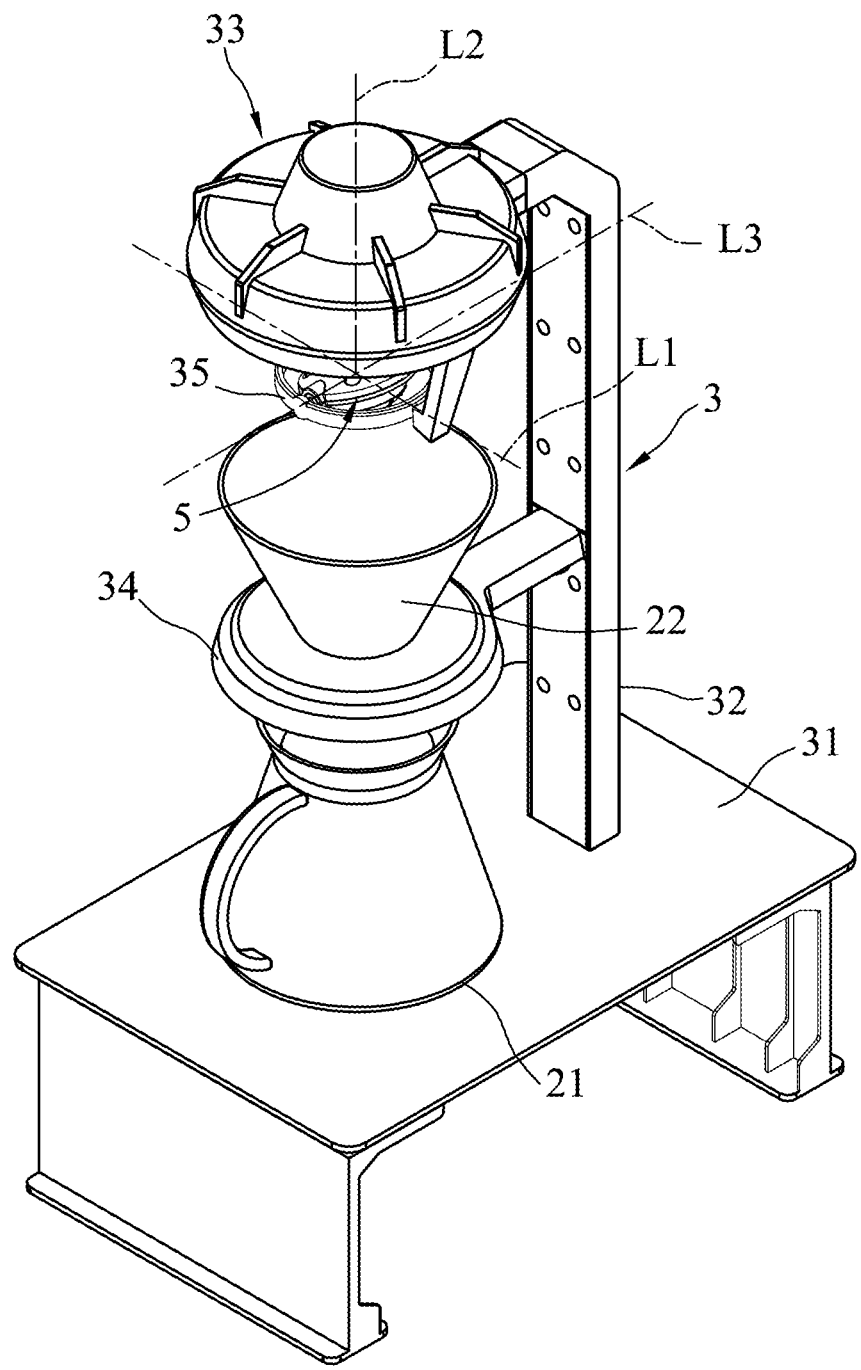
FIG. 1 is a perspective view illustrating a first embodiment of a fluid pourover device co-operated with a filter holder and a vessel.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
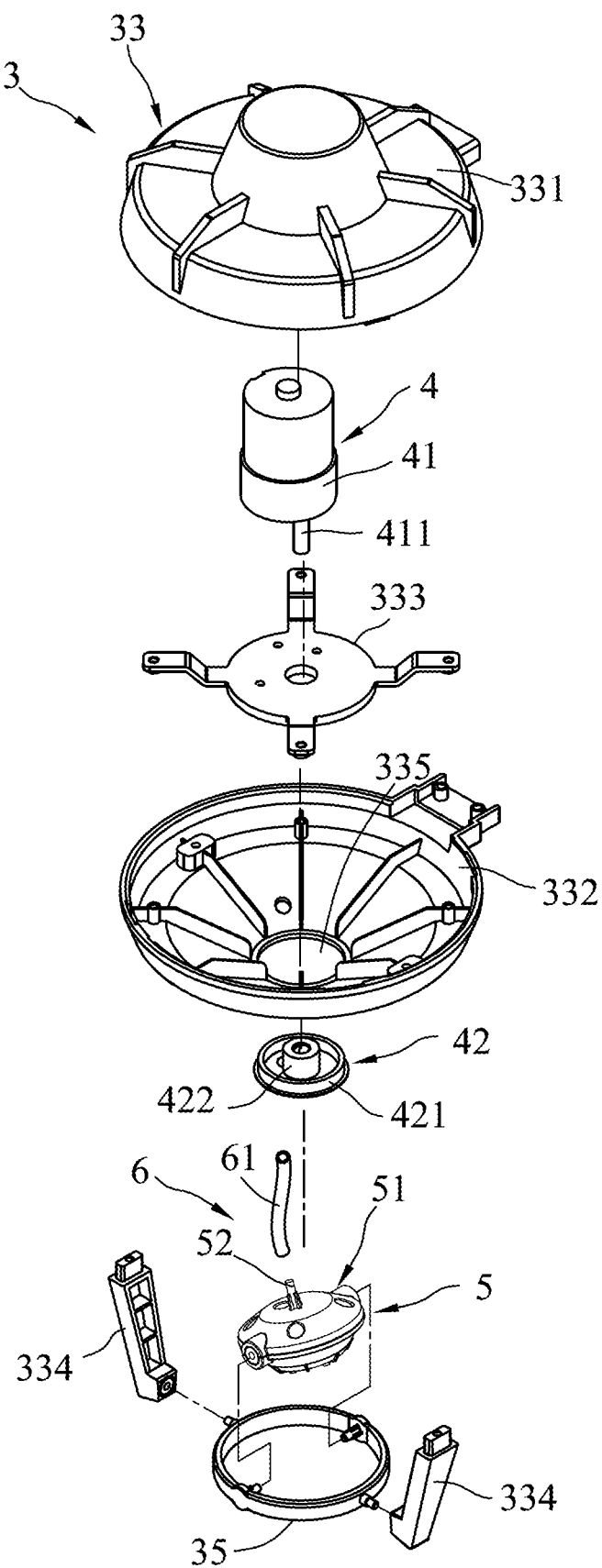
FIG. 2 is an exploded perspective view of the first embodiment.
Figure 3:
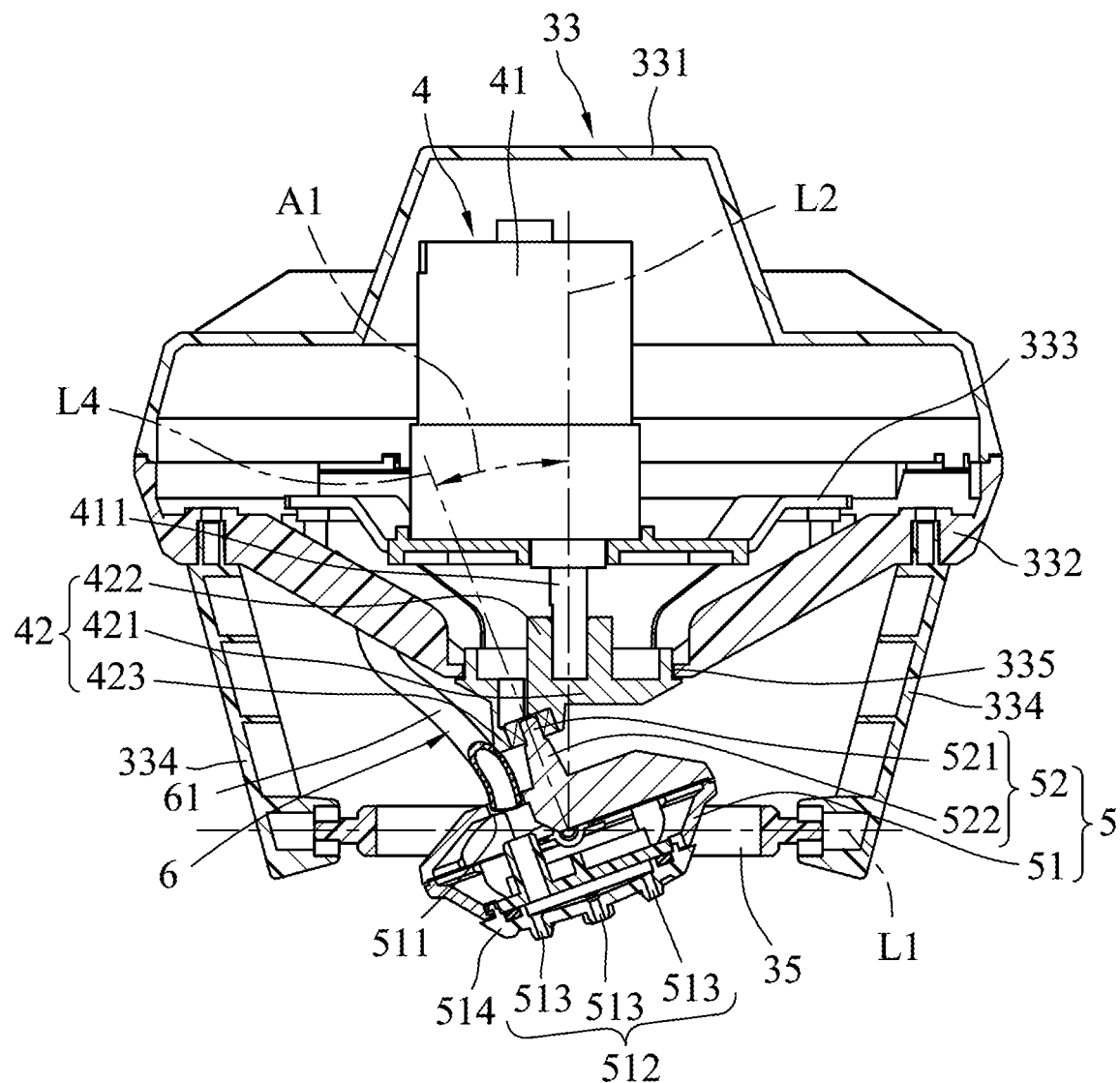
FIG. 3 is a partly sectional view of the first embodiment.

Referring to FIGS. 1 to 3, a first embodiment of a fluid pourover device according to the disclosure is adapted to pour a fluid (such as water, sugar water, milk, etc.) over a brewing substance (such as grounds of coffee, tea, tea leaves, etc.) for brewing a beverage. In the following description, the first embodiment is co-operated with a filter holder 22 and a vessel 21, and water is used as the fluid.

The fluid pourover device of the first embodiment includes a machine frame unit 3 defining an accommodation space therein, a driving unit 4, a fluid delivering unit 5, and a fluid supply unit 6 disposed in the accommodation space of the machine frame unit 3.

The machine frame unit 3 includes a base seat 31, an upright column 32 extending in an upright direction from the base seat 31, a cantilevered housing 33 disposed on an upper end of the column 32, a platform 34 extending forwardly from the upright column and below the housing 33 for placement of a filter holder 22 thereon, and a ring support 35 which is disposed on the housing 33.

The housing 33 includes an upper shell 331 and a lower shell 332 connected to each other in the upright direction to define the accommodation space therein, a support plate 333 interposed between the upper and lower shells 331, 332, and two pivot arms 334 extending downwardly from left and right sides of the lower shell 332, respectively. The lower shell 332 has a central penetrating bore 335. The ring support 35 is pivotably connected to lower ends of the arms 334 about a first pivot axis (L1) in a left-and-right direction so as to permit a forward-and-rearward swing movement about the first pivot axis (L1).

The driving unit 4 includes a motor 41 supported on the support plate 333, and an eccentric member 42 disposed on a bottom portion of the lower shell 332. The motor 41 has a driving shaft 411 which extends downwardly through the support plate 333 and which is rotatable about a rotating axis (L2) that extends in the upright direction. The eccentric member 42 has a disk portion 421 disposed in the penetrating bore 335 of the lower shell 332, a tubular shaft insert portion 422 which extends upwardly and along the rotating axis from a center of the disk portion 421 to be engaged with the driving shaft 411 of the motor 41, and an eccentric portion 423 which extends downwardly from the disk portion 421 and which is offset from the rotating axis (L2).

The fluid delivering unit 5 includes a fluid delivering member 51 pivotably connected to the ring support 35 of the machine frame unit 3, and a transmitting shaft 52 extending upwardly from the fluid delivering member 51 and engaged with the eccentric member 42 of the driving unit 4.

Figure 8:
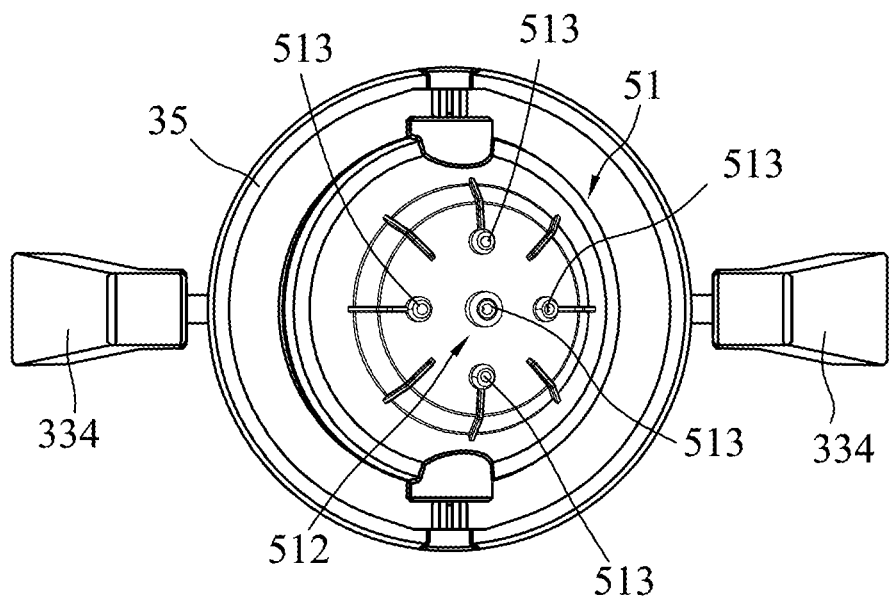
FIGS. 8, 9, 10, and 11 are schematic bottom views illustrating the operation states corresponding to those of FIGS. 4 to 7, respectively.

Specifically, the fluid delivering member 51 is pivotably connected to front and rear sides of the ring support 35 about a second pivot axis (L3) in a front-and-rear direction so as to permit a leftward-and-rightward swing movement about the second pivot axis (L3) (see FIGS. 4 to 7). The fluid delivering member 51 has a fluid charging port 511 at an upper end wall thereof, and extends downwardly and along a transmitting axis (L4) to terminate at a nozzle forming portion 514 that is normal to the transmitting axis (L4). The nozzle forming portion 514 has a nozzle assembly 512 which is formed with five nozzles 513, as shown in FIG. 8. One of the nozzles 513 is formed at a center of the nozzle forming portion 514, and the others of the nozzles 513 are arranged to be angularly displaced from one another about the center of the nozzle forming portion 514. In this embodiment, the nozzles 513 are arranged as a cross in shape. Each nozzle 513 defines a fluid delivering path of a column (P1) of water that is parallel to the transmitting axis (L4) (see FIGS. 4 to 7). Alternatively, the nozzle forming portion 514 can be formed with only one nozzle 513 defining a fluid delivering path of a column (P1) of water.

The transmitting shaft 52 extends along the transmitting axis (L4) that is inclined relative to and intersects the rotating axis (L2) by an included angle (A1) (i.e., that is inclined relative to the upright direction). The transmitting shaft 52 has an upper shaft end 521 which is engaged in the eccentric portion 423 of the eccentric member 42, and a lower shaft end 522 connected between the upper shaft end 521 and the fluid delivering member 51. Hence, the transmitting shaft 52 is connected with the driving unit 4 and offset from the rotating axis (L2) to keep an inclined rotation of the fluid delivering member 51 relative to the rotating axis (L2) so as to bring the fluid delivering paths inclined relative to the rotating axis (L2). In this embodiment, the included angle (A1) ranges from 10 degrees to 30 degrees, and may be 20 degrees for example.

The fluid supply unit 6 includes a supply pipe 61 in fluid communication with the fluid charging port 511 for supplying water to the fluid delivering member 51.

In operation, the motor 41 is actuated to drive rotation of the eccentric member 42 about the rotating axis (L2) to permit an inclined rotation of the fluid delivering member 51 relative to the rotating axis (L2) through the transmitting shaft 52 extending along the transmitting axis (L4) that is inclined relative to the rotating axis (L2). Meanwhile, during rotation of the upper shaft end 521 of the transmitting shaft 52 about the rotating axis (L2), the leftward-and-rightward swing movement of the fluid delivering member 51 about the second pivot axis (L3) relative to the ring support 35, and a forward-and-rearward swing movement of the ring support 35 about the first pivot axis (L1) relative to the pivot arms 334 of the housing 33 are generated so as to permit the fluid pourover device of this embodiment to perform the following pourover process.

Figure 4:
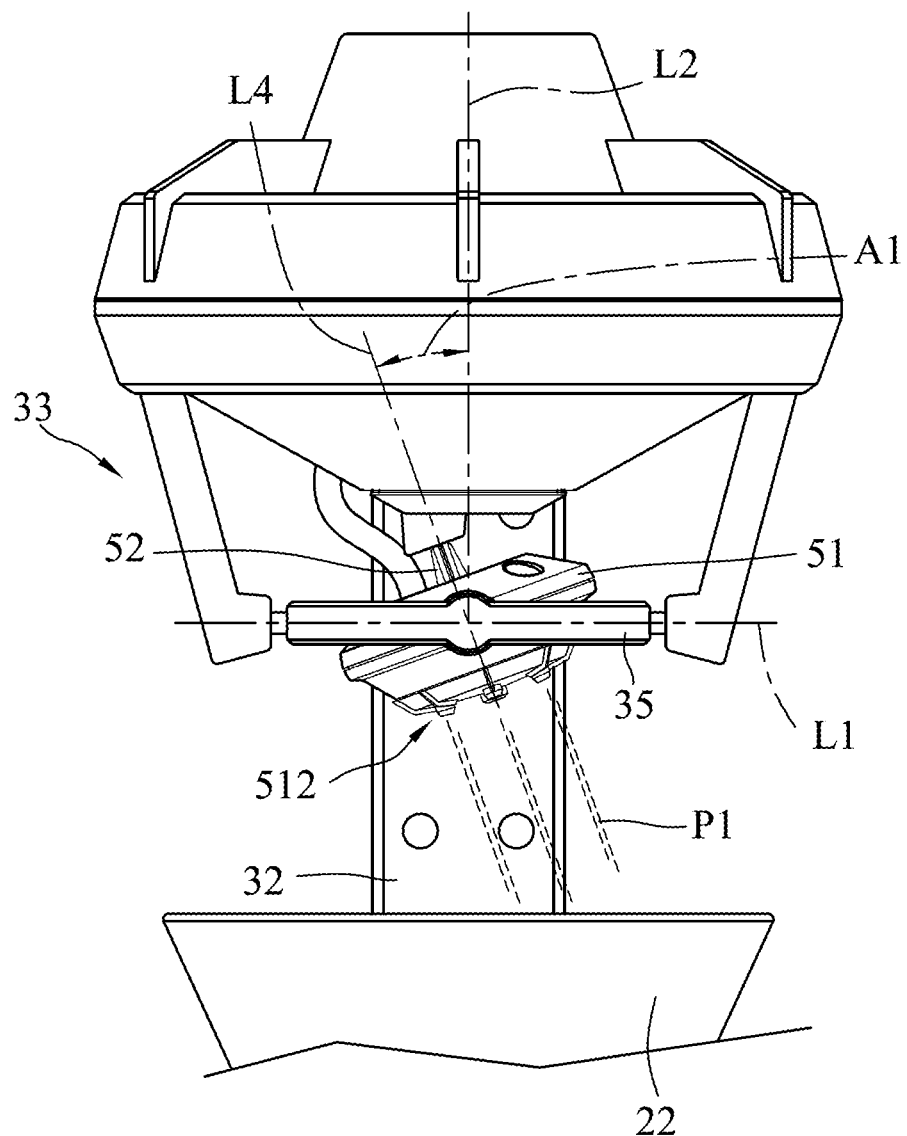
FIGS. 4, 5, 6, and 7 are schematic views illustrating the operation states of the first embodiment.
Figure 5:
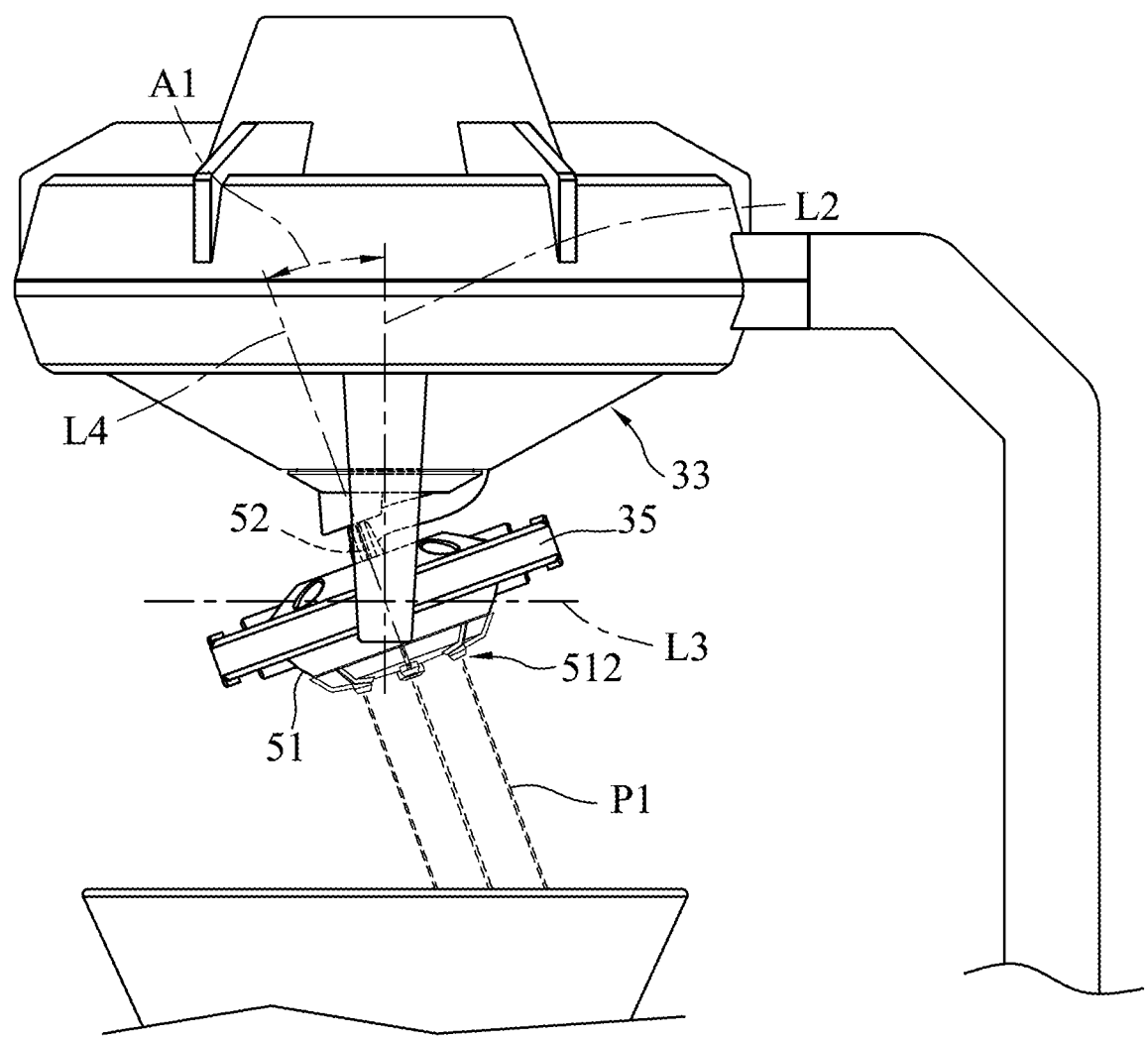
Figure 6:
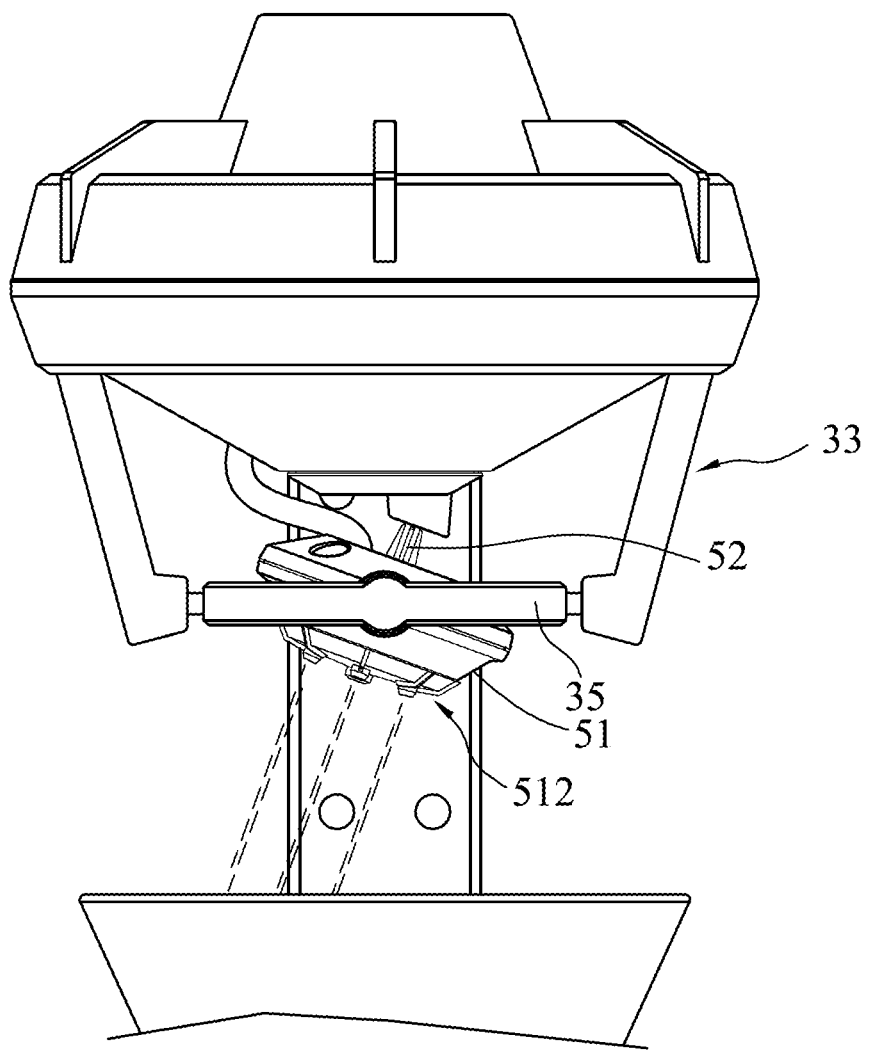
Figure 7:
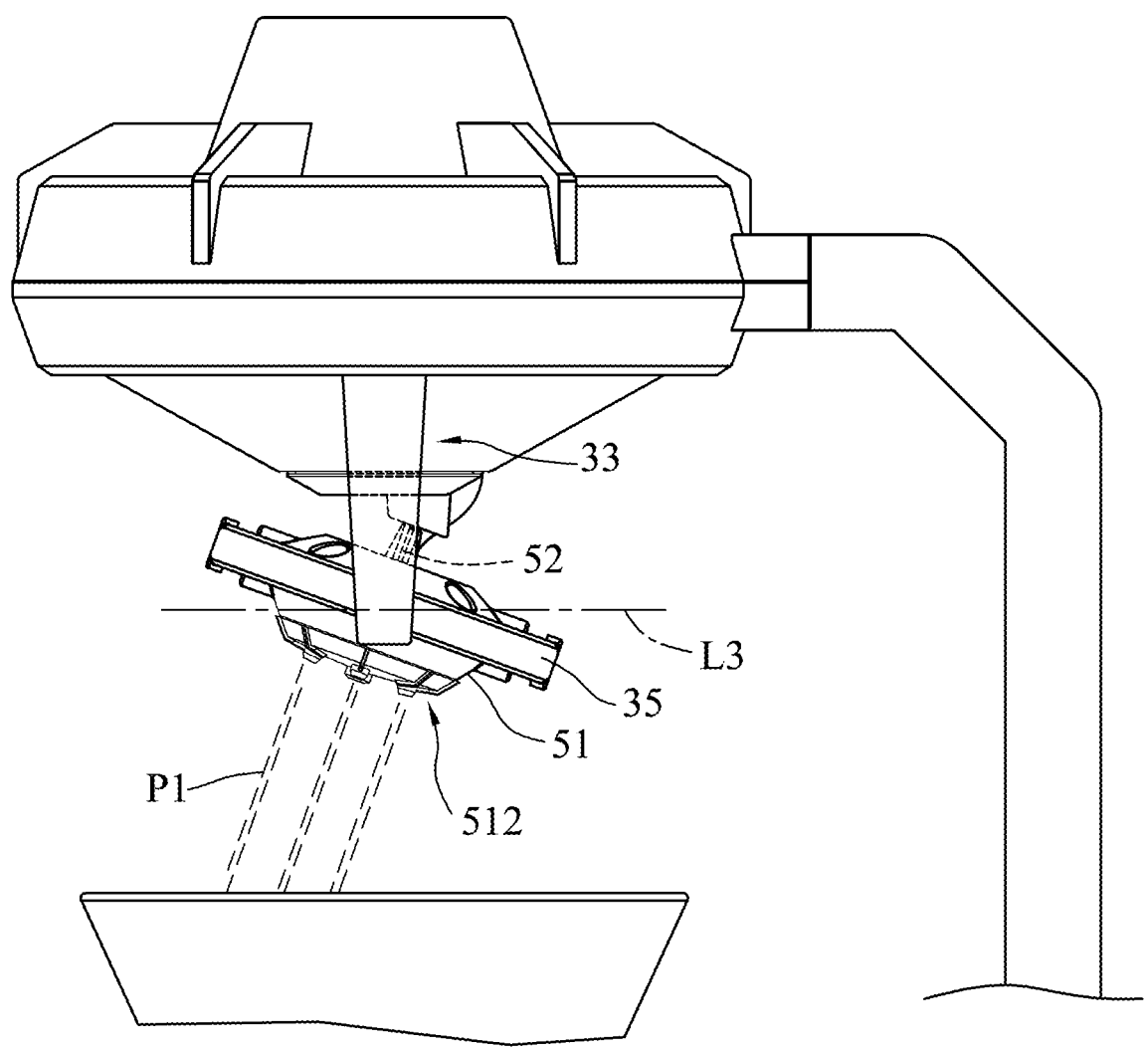
Figure 9:
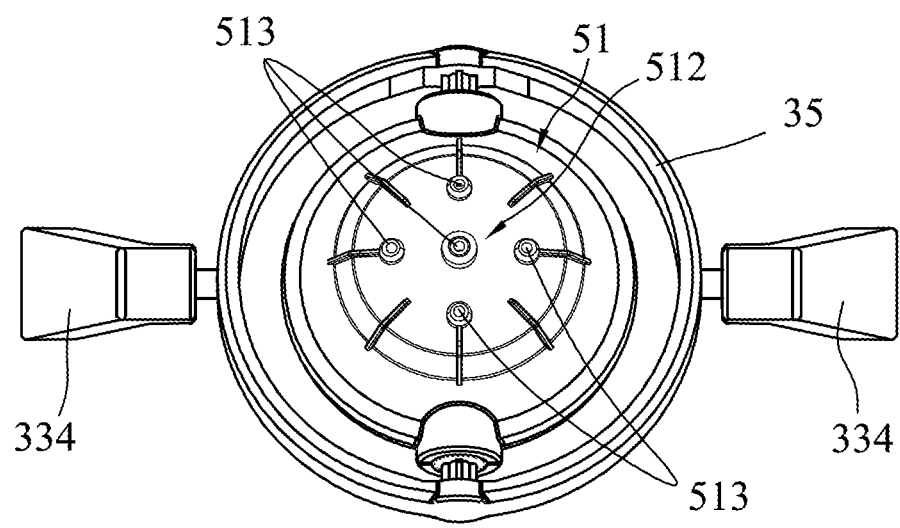
Figure 10:
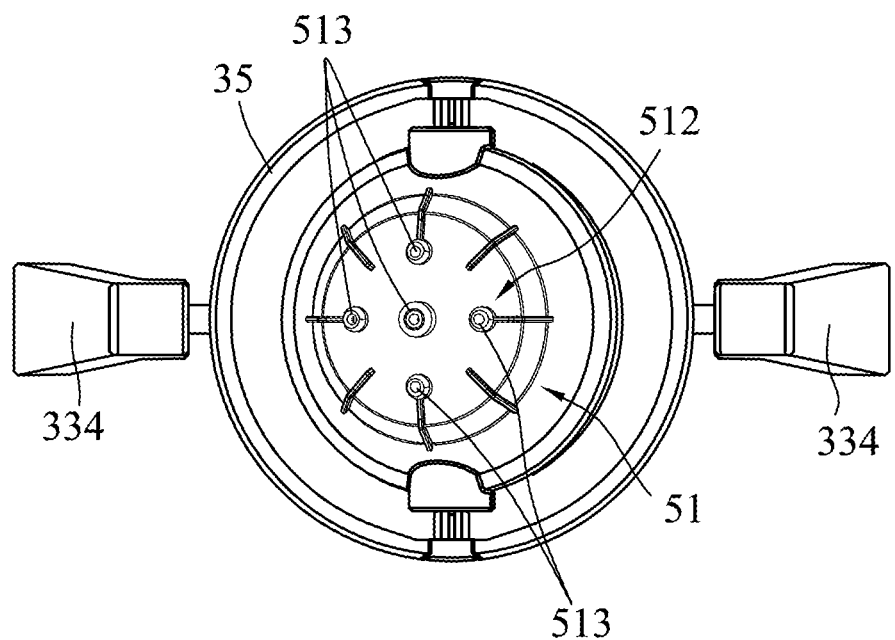
Figure 11:
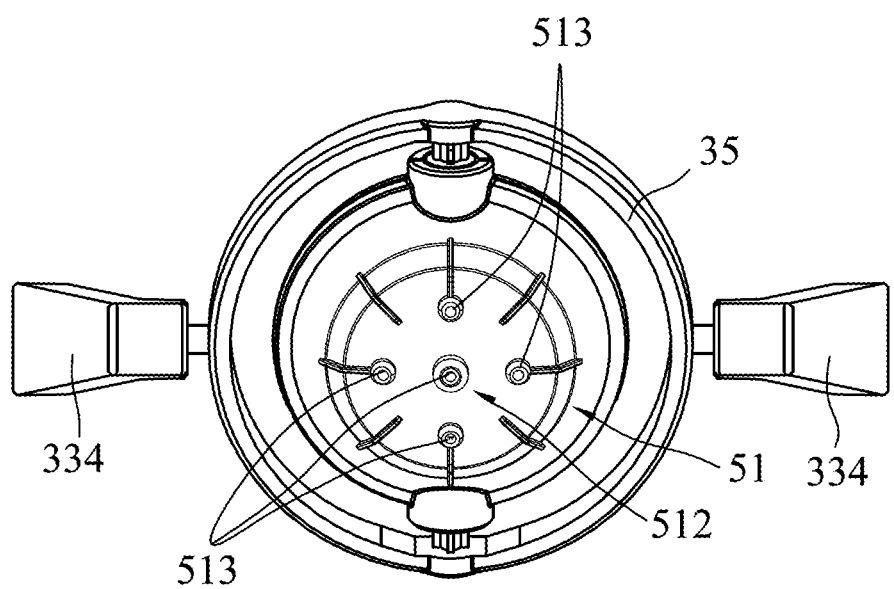

In a state shown in FIGS. 4 and 8, the transmitting shaft 52 extends leftwardly and upwardly such that the fluid delivering member 51 is lifted rightwardly so as to permit rightward and downward delivery of water from the nozzle assembly 512, while the ring support 35 keeps horizontal. In a state shown in FIGS. 5 and 9, the transmitting shaft 52 extends forwardly and upwardly such that the fluid delivering member 51 is pivoted not to be inclined relative to the ring support 35 and the ring support 35 is pivoted to be lifted rearwardly relative to the housing 33 so as to permit rearward and downward delivery of water from the nozzle assembly 512. In a state shown in FIGS. 6 and 10, the transmitting shaft 52 extends rightwardly and upwardly such that the fluid delivering member 51 is lifted leftwardly to be inclined relative to the ring support 35 so as to permit leftward and downward delivery of water from the nozzle assembly 512, while the ring support 35 is placed horizontally. In a state shown in FIGS. 7 and 11, the transmitting shaft 52 extends rearwardly and upwardly such that the fluid delivering member 51 is pivoted not to be inclined relative to the ring support 35 and the ring support 35 is pivoted to be lifted forwardly relative to the housing 33 so as to permit forward and downward delivery of water from the nozzle assembly 512.

In this embodiment, the first pivot axis (L1), the rotating axis (L2), the second pivot axis (L3) and the transmitting axis (L4) intersect one another at an intersecting point. The fluid delivering unit 5 is supported at the intersecting point as a fulcrum to be moved around the rotating axis (L2) relative to the intersecting point so as to perform a steady delivering process. The fluid pourover device of this embodiment can be used in a fluid pourover method. The method includes the steps of: (a) providing the fluid pourover device; (b) providing a fluid to the fluid pourover device, wherein the fluid supply unit 6 is operated to introduce the fluid to the fluid delivering unit 5; and (c) operating the fluid pourover device to deliver the fluid, wherein the driving unit 4 is operated to drive a reciprocating rotation of the fluid delivering unit 5 to permit the fluid to be delivered from the fluid delivering member 51 in an inclined direction relative to the upright direction and surround an upright line in the upright direction. During an inclined rotation of the fluid delivering member 51, the fluid delivering paths of the columns (P1) are formed in a conical shape (or a frusto-conical shape).

In use, a filter holder 22 is provided below the fluid delivering unit 5 and is filled with coffee grounds. With the inclined rotation of the fluid delivering member 51, the water columns (P1) delivered from the nozzle assembly 512 are formed to have the fluid delivering paths be of a conical shape so as to simulate a manual pourover action and so as to "automatically" make a "handmade" brewing coffee. Additionally, through control of the rotational speed of the motor 41, the speed of movement of the water columns (P1) can be adjusted to make a variety of beverages with different tastes. Moreover, with the conical fluid delivering paths of the water columns (P1), the water can be evenly poured over the coffee grounds with a relatively large contact area so as to increase the pourover and extracting efficiency. The fluid pourover device is configured to have the fluid delivering path of each water column (P1) intersecting the upright line by an included angle (A1) that ranges from 10 degrees to 30 degrees (for instance, 20 degrees), so as to be used perfectly with a commercially available filter holder 22 where the delivered fluid can contact efficiently a surrounding wall of the holder 22 to obtain a great brewing effect.

As illustrated, with the driving unit 4 which is operated to drive an inclined rotation of the fluid delivering member 51 to deliver a fluid in an inclined delivering path, a manual pour-over effect for evenly and efficiently brewing a beverage can be achieved.

Figure 12:
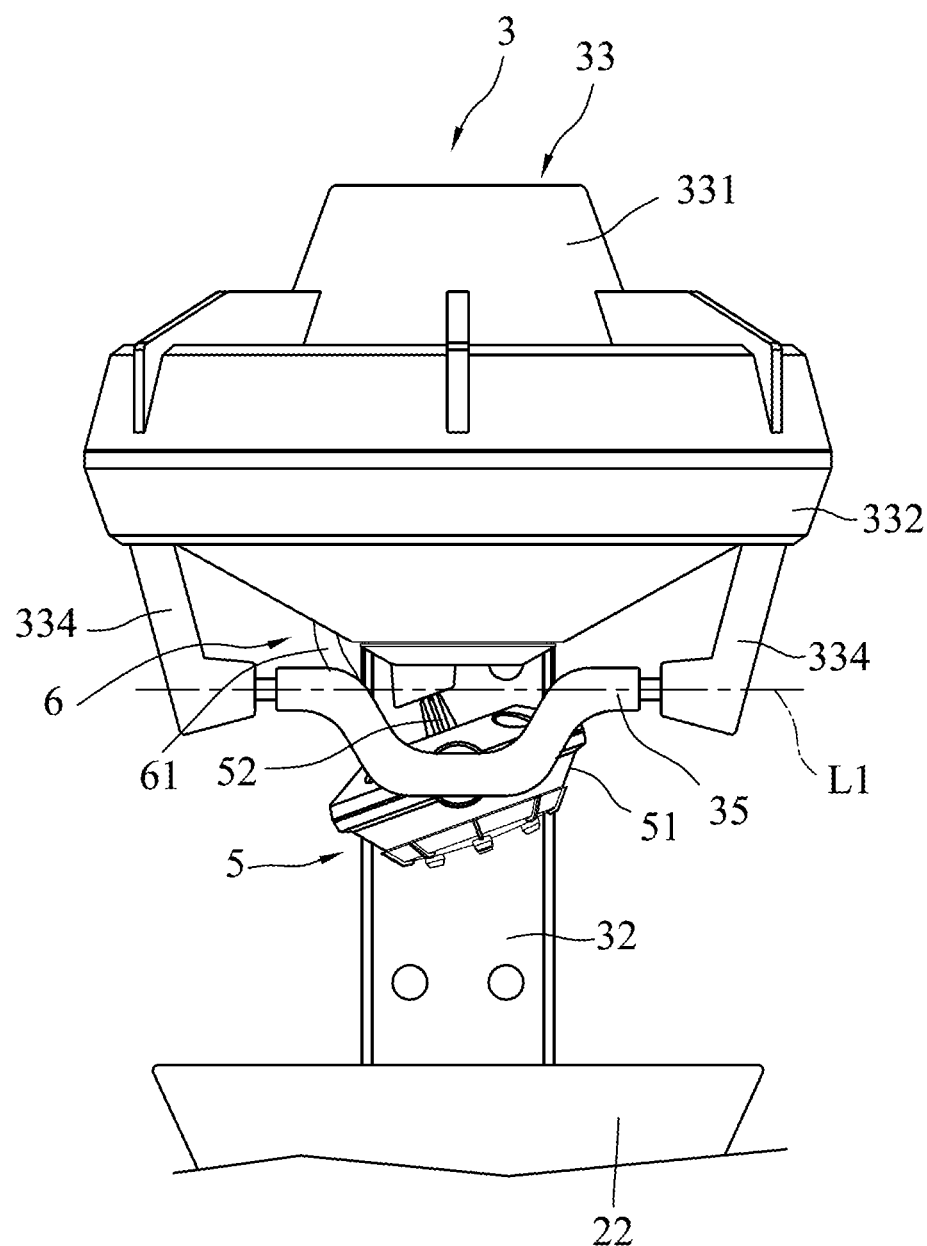
FIG. 12 is a schematic front view illustrating a second embodiment of a fluid pourover device.

Referring to FIG. 12, in a second embodiment, the ring support 35 is configured to have front and rear sections each generally formed in a U-shape.

Figure 13:
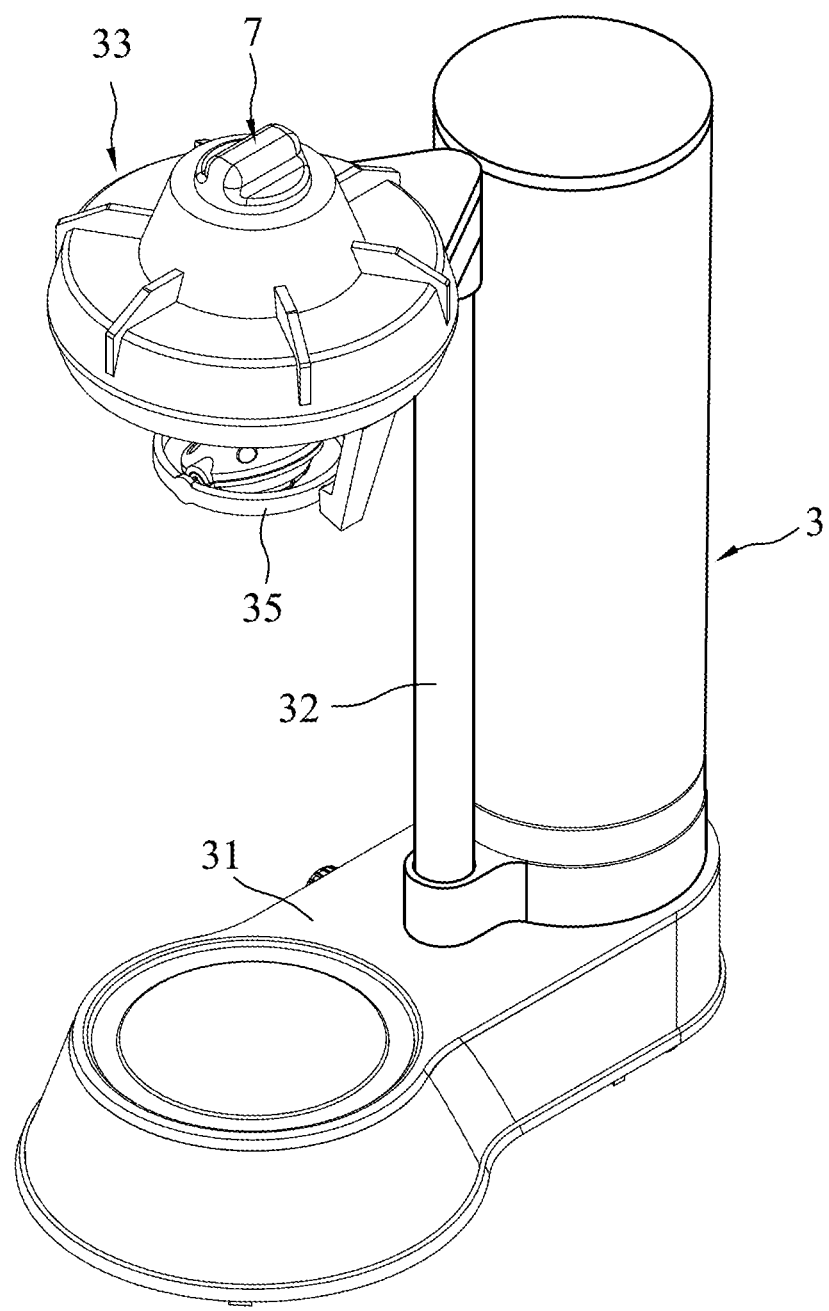
FIG. 13 is a perspective view illustrating a third embodiment of a fluid pourover device.
Figure 14:
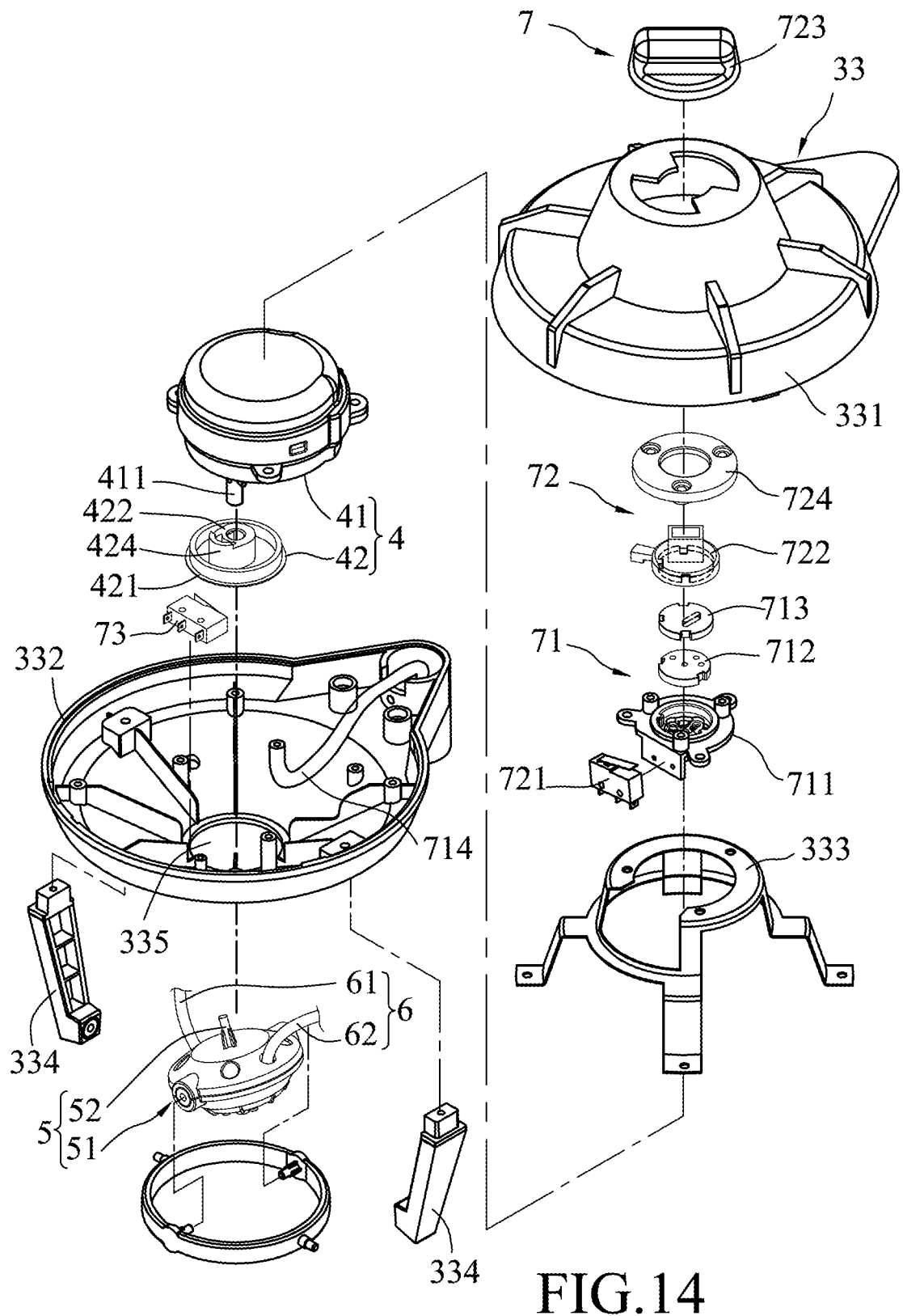
FIG. 14 is an exploded perspective view of the third embodiment.
Figure 15:
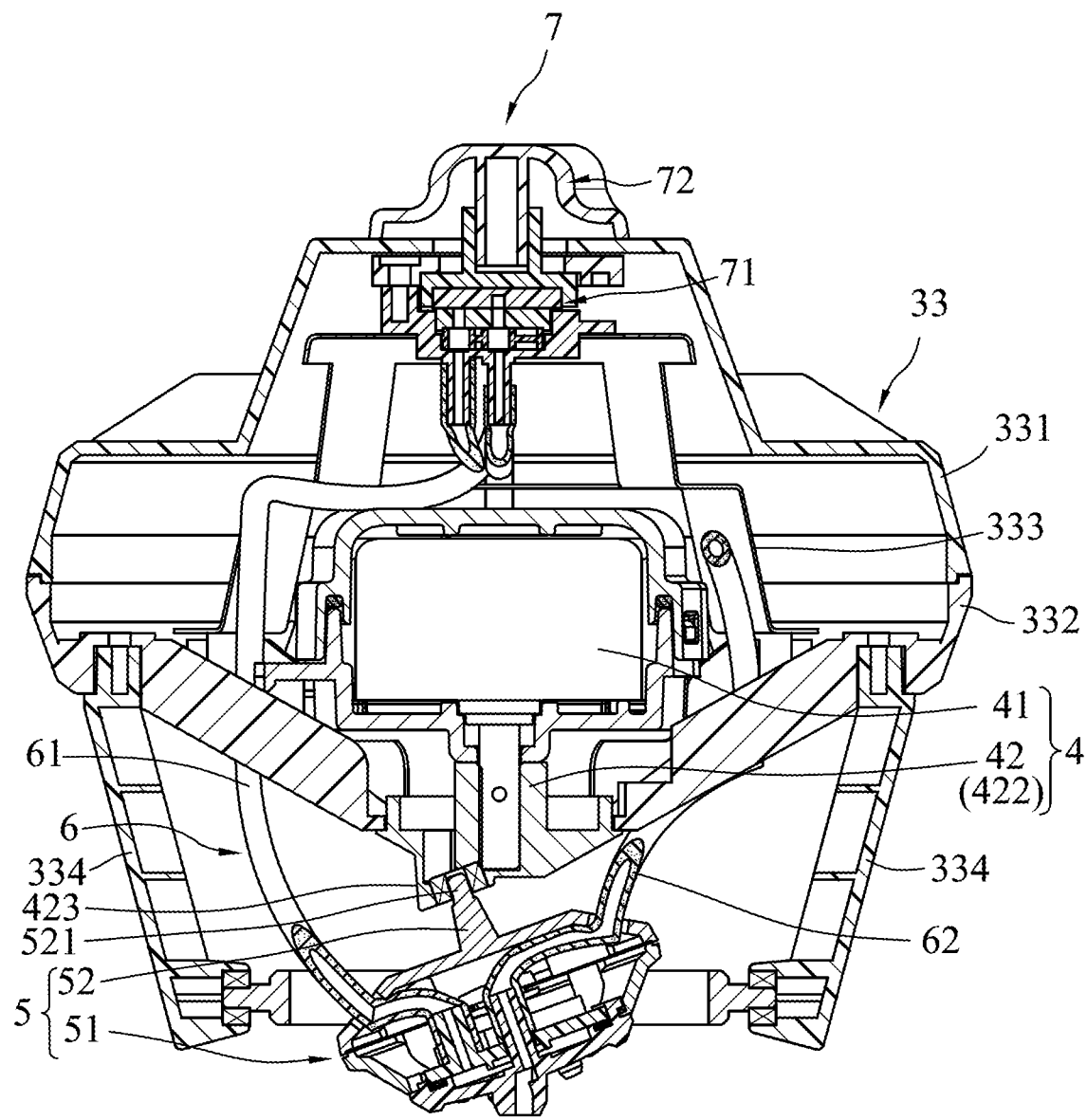
FIG. 15 is a sectional view of the third embodiment.

Referring to FIGS. 13 to 15, in a third embodiment, the fluid pourover device further includes a control unit 7 coupled with the driving unit 4 to be operatively shiftable between a rotating delivering mode and a vertical delivering mode. The machine frame unit 3 includes a base seat 31, an upright column 32 and a cantilevered housing 33, and a platform 34 (with reference to FIG. 1) is dispensed therewith. Moreover, the fluid supply unit 6 includes first and second pipes 61, 62 in fluid communication with the control unit 7 for introducing fluid therein from the control unit 7.

Figure 16:
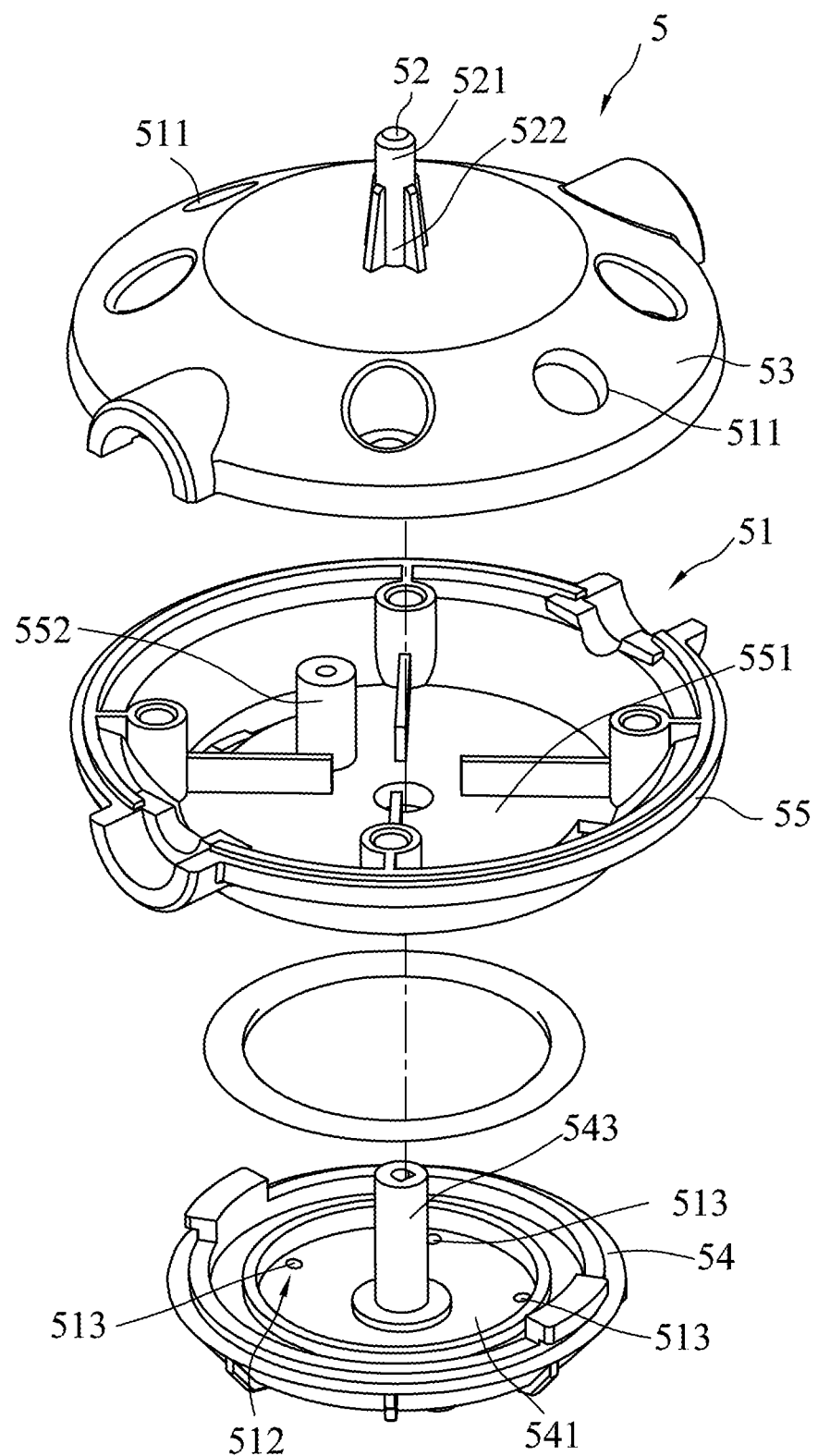
FIG. 16 is an exploded perspective view of a fluid delivering unit of the third embodiment.
Figure 17:
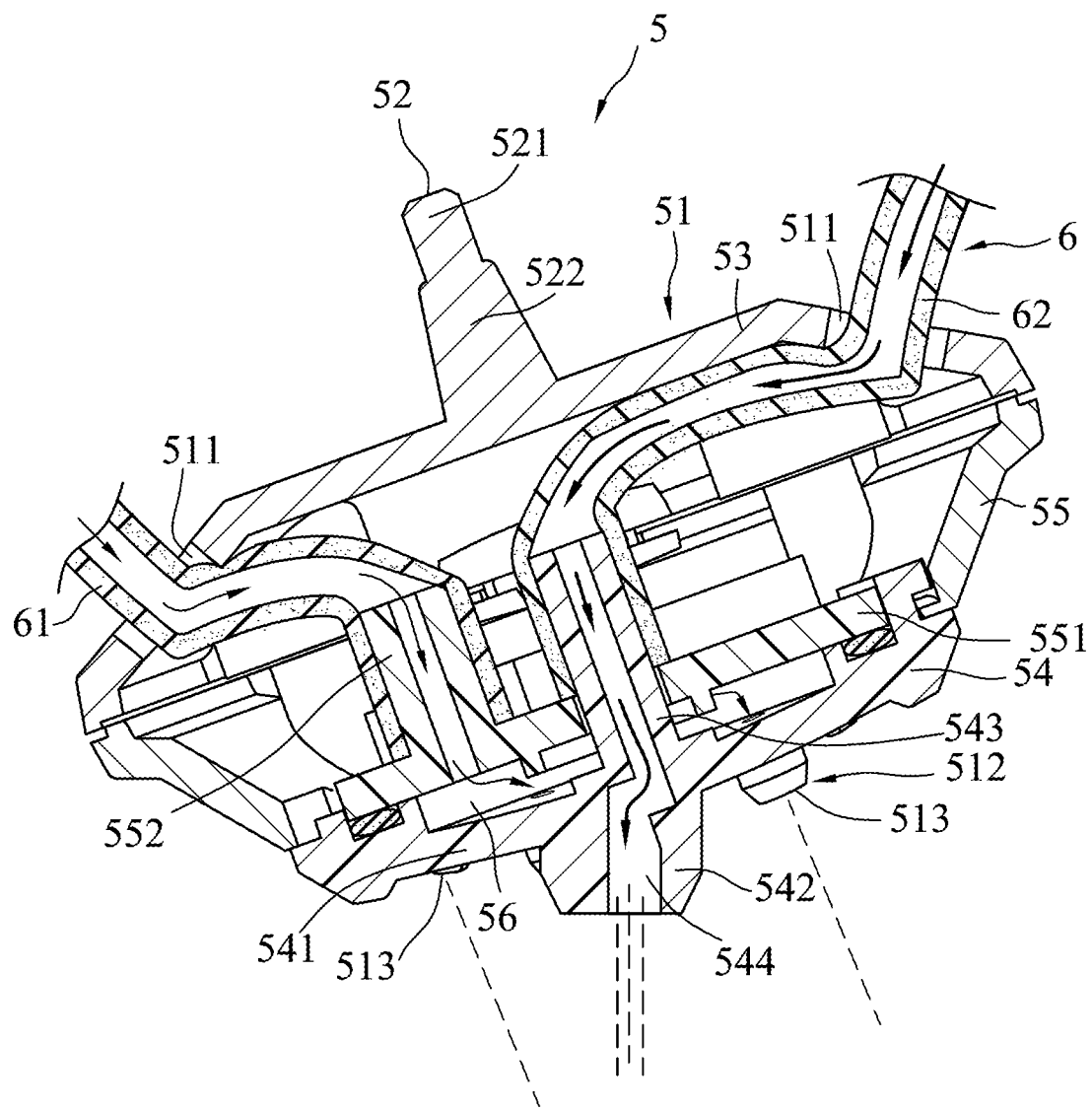
FIG. 17 is a fragmentary sectional view of the fluid delivering unit, illustrating a fluid flowing in the fluid delivering unit.

With reference to FIGS. 15 to 17, the fluid delivering member 51 has an upper seat 53 on which the transmitting shaft 52 is disposed, a lower seat 54 which is disposed normal to the transmitting axis (L4) and spaced apart from the upper seat 53 in a direction of the transmitting axis (L4), and a middle seat 55 which is interposed between the upper and lower seats 53, 54.

The upper seat 53 is inclined relative to a horizontal plane, is connected with the lower shaft end 522 of the transmitting shaft 52, and is formed with two radially opposite inlet ports 511.

The lower seat 54 has a lower wall 541 which is inclined relative to a horizontal plane and which serves as the nozzle forming portion that the nozzle assembly 512 is disposed thereon, a tubular wall 542 which extends downwardly in the upright direction from the lower wall 541 and which cooperates with the lower wall 541 to define therein a vertical delivering channel 544 that extends through the nozzle forming portion in the upright direction to define a vertical flowing path, and a first tubular member 543 which extends upwardly from the lower wall 541 and which is connected with the tubular wall 542 to be in fluid communication with the vertical delivering channel 544. The first tubular member 543 can be integrally formed and connected with the lower wall 541 and the tubular wall 542.

The middle seat 55 has a base wall 551 which is disposed normal to the transmitting axis (L4) and through which the first tubular member 543 penetrates at a central portion thereof, and a second tubular member 552 which extends upwardly from the base wall 551. The base wall 551 has a peripheral wall extending to flare radially and upwardly, and a base portion cooperating with the lower seat 54 to define a fluid chamber 56 that is in fluid communication with the nozzle assembly 512. The fluid chamber 56 is not in fluid communication with the first tubular member 543 and the vertical delivering channel 544. The second tubular member 552 is radially spaced apart from the first tubular member 543, and is in fluid communication with the fluid chamber 56 through the base wall 551.

The first pipe 61 of the fluid supply unit 6 is inserted into the inlet port 511 of the upper seat 53 at the left side thereof, and is sleeved on and in fluid communication with the second tubular member 552 so that fluid can flow from the first pipe 61 to the nozzle assembly 512 through the second tubular member 552 and the fluid chamber 56. The second pipe 62 of the fluid supply unit 6 is inserted into the inlet port 511 of the upper seat 53 at the right side thereof, and is sleeved on and in fluid communication with the first tubular member 543 so that fluid can flow from the second pipe 62 to the vertical delivering channel 544 through the first tubular member 543.

In the rotating delivering mode, the fluid is permitted to enter the first pipe 61 and to be delivered from the nozzle assembly 512 in a direction of the transmitting axis (L4) inclined relative to the upright direction during rotation of the fluid delivering unit 5. In the vertical delivering mode, the fluid delivering member 51 is held in a state shown in FIG. 17, and the fluid is permitted to enter the second pipe 62 and to be delivered vertically from the vertical delivering channel 544.

Figure 18:
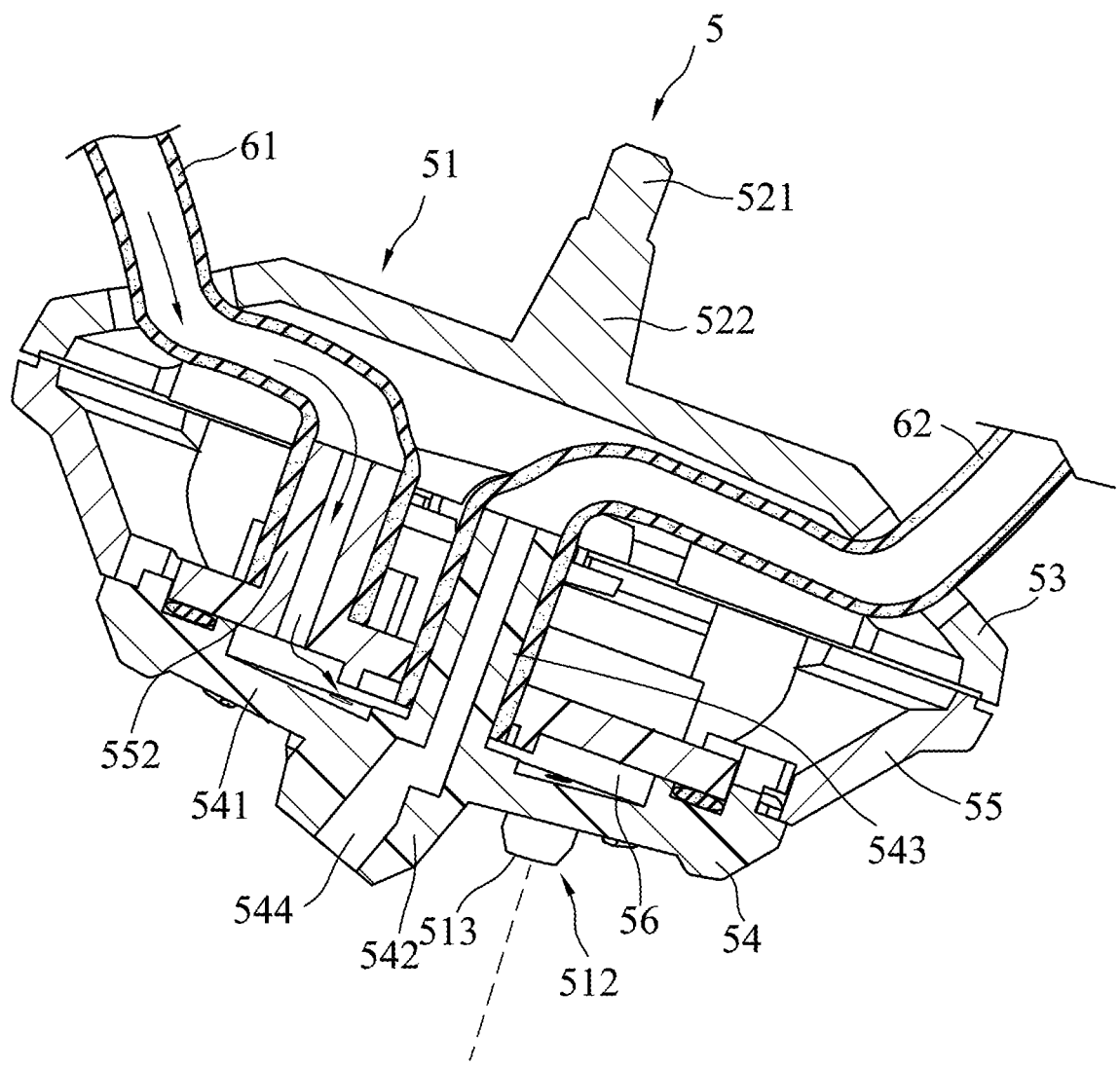
FIG. 18 is a fragmentary sectional view of the fluid delivering unit, illustrating the fluid delivering unit rotated at another angle and the fluid flowing therein.

Along with the inclined rotation of the fluid delivering member 51, the vertical delivering channel 544 may be moved to be vertical to a horizontal plane as shown in FIG. 17, or not vertical to a horizontal plane as shown in FIG. 18. The control unit 7 is disposed not only to control the rotation of the fluid delivering member 51 so as to facilitate a rotating or vertical delivery of the fluid delivering member 51, but also to control of fluid entrance into the first or second pipe 61, 62.

Figure 19:
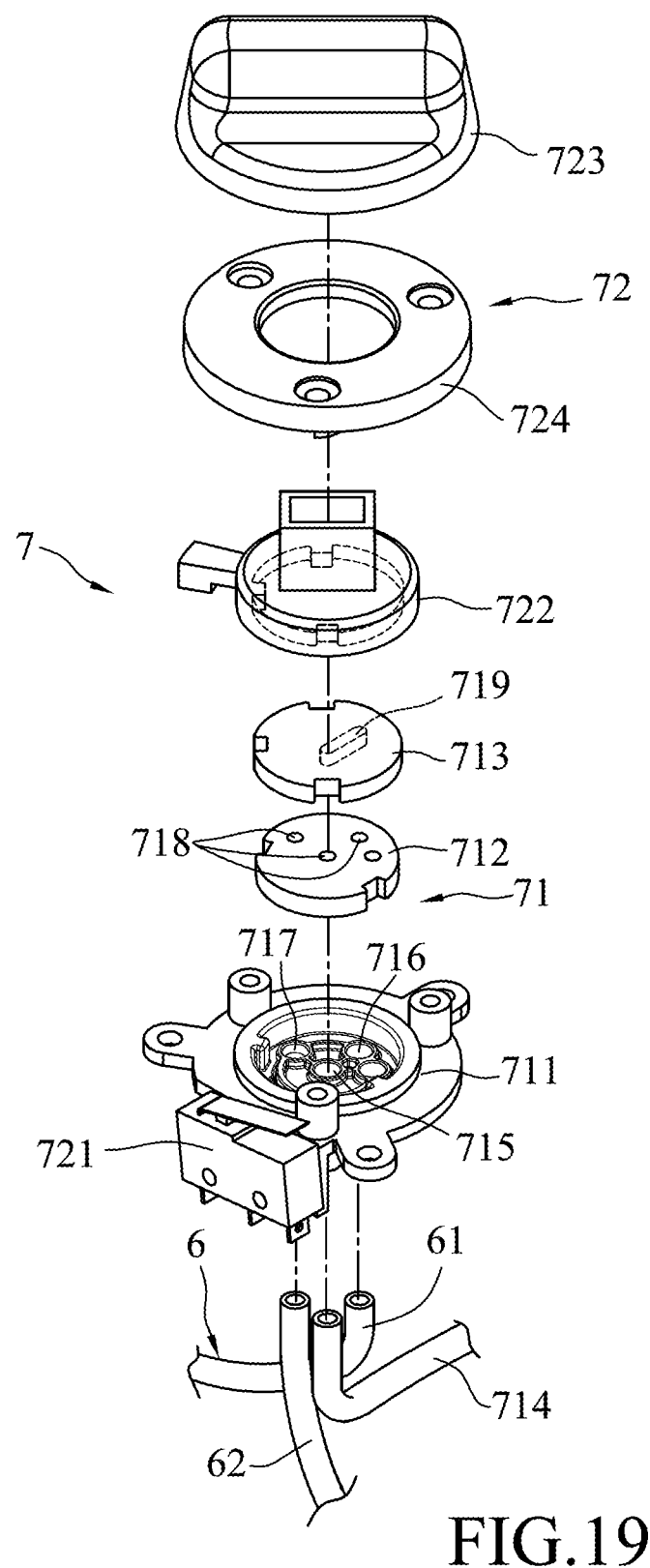
FIG. 19 is an exploded perspective view of a control unit of the third embodiment in a rotating delivering mode.

With reference to FIGS. 14, 15 and 19, the support plate 333 of the housing 33 has four legs which are disposed on the lower shell 332, and is in the form of steps to be converged upwardly. The motor 41 of the driving unit 4 is disposed on the lower shell 332 and supported in a space defined by a lower wider portion of the support plate 333. The eccentric member 42 of the driving unit 4 further has a contact portion 424 (with reference to FIG. 20) which extends radially and outwardly from and is integrally formed with the shaft insert portion 422.

Figure 20:
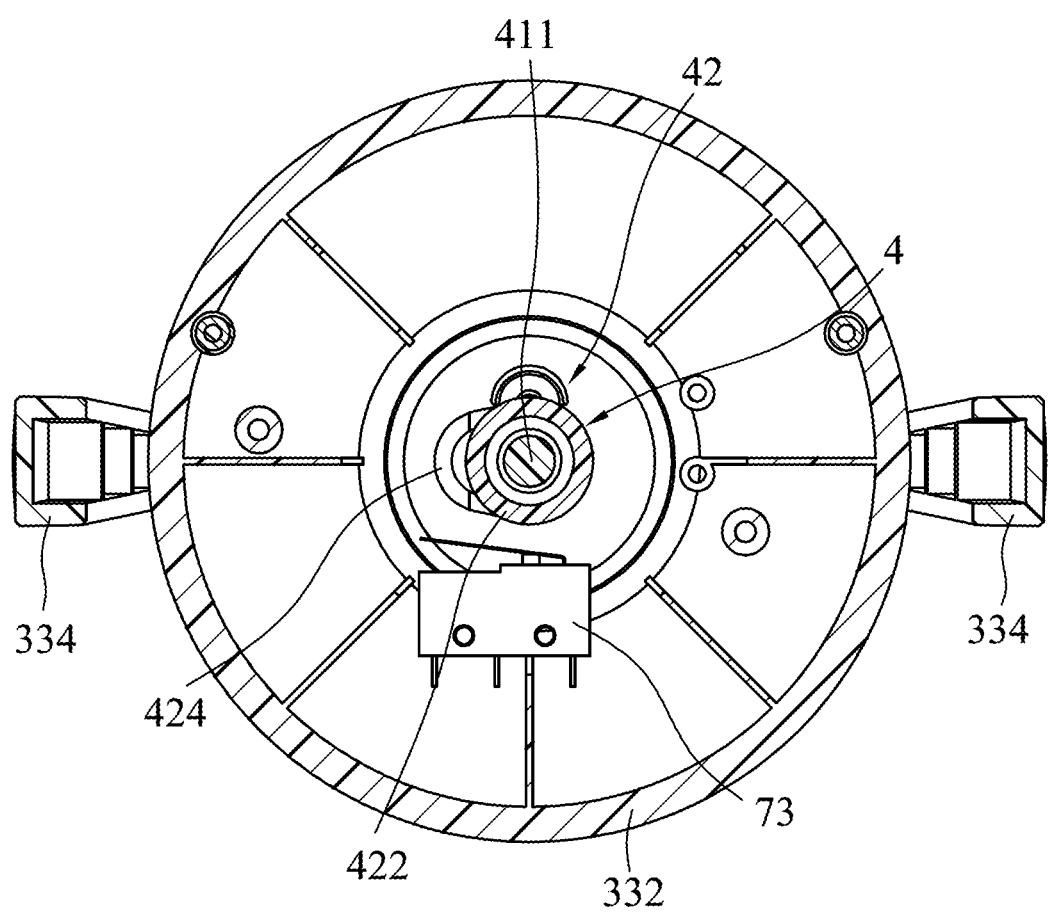
FIG. 20 is a cross-sectional view of the third embodiment, illustrating a state that a contact portion of an eccentric member is spaced apart from a positioning switch.

The control unit 7 includes a fluid control module 71 disposed on the support plate 333, a mode shift module 72 operable by a user to drive the mode shift module 72 to be shifted between the rotating and vertical delivering modes, and a positioning switch 73 disposed on the lower shell 332 and radially spaced apart from the shaft insert portion 422 of the eccentric member 42 (with reference to FIG. 20).

The fluid control module 71 has a fluid valve seat member 711 disposed on an upper portion of the support plate 333, a disk-shaped stationary valve member 712 non-rotatably disposed on the fluid valve seat member 711, a disk-shaped movable valve member 713 rotatably disposed on the stationary valve member 712, and a fluid supply pipe 714 connected between a water source (not shown) and the fluid valve seat member 711.

The fluid valve seat 711 has a central inlet port 715 connected to be in fluid communication with an end of the fluid supply pipe 714, a first inlet port 716 radially spaced apart from the central inlet port 715 and connected to be in fluid communication with an end of the first pipe 61, and a second inlet port 717 angularly displaced from the first inlet port 716 and connected to be in fluid communication with an end of the second pipe 62. The stationary valve member 712 has a plurality of penetrating holes 718 respectively in fluid communication with the central, first and second inlet ports 715, 716, 717. The movable valve member 713 has a communication groove 719 recessed in a bottom wall thereof and having an end portion in fluid communication with the central inlet port 715 through the penetrating hole 718 in the stationary valve member 712, and the other end portion that is moved with rotation of the movable valve member 713 to be in fluid communication with the first inlet port 716 or the second inlet port 717.

The mode shift module 72 includes a contact switch 721 disposed adjacent to the fluid valve seat 711, a shift member 722 disposed to rotate the movable valve member 713, a rotary knob 723 disposed to deliver from the upper shell 331 to be manually operable, and a ring member 724 disposed between the rotary knob 723 and the shift member 722. The contact switch 721 is in signal connection with the positioning switch 73, such as that through a wire or wireless connection. The shift member 722 is configured to have a radially-delivering portion, a central upwardly-delivering portion for engaging the rotary knob 723 (with reference to FIG. 15), and a lower recessed portion for engaging the movable valve member 713 so as to drive rotation of the movable valve member 713 during turning of the rotary knob 723.

Figure 21:
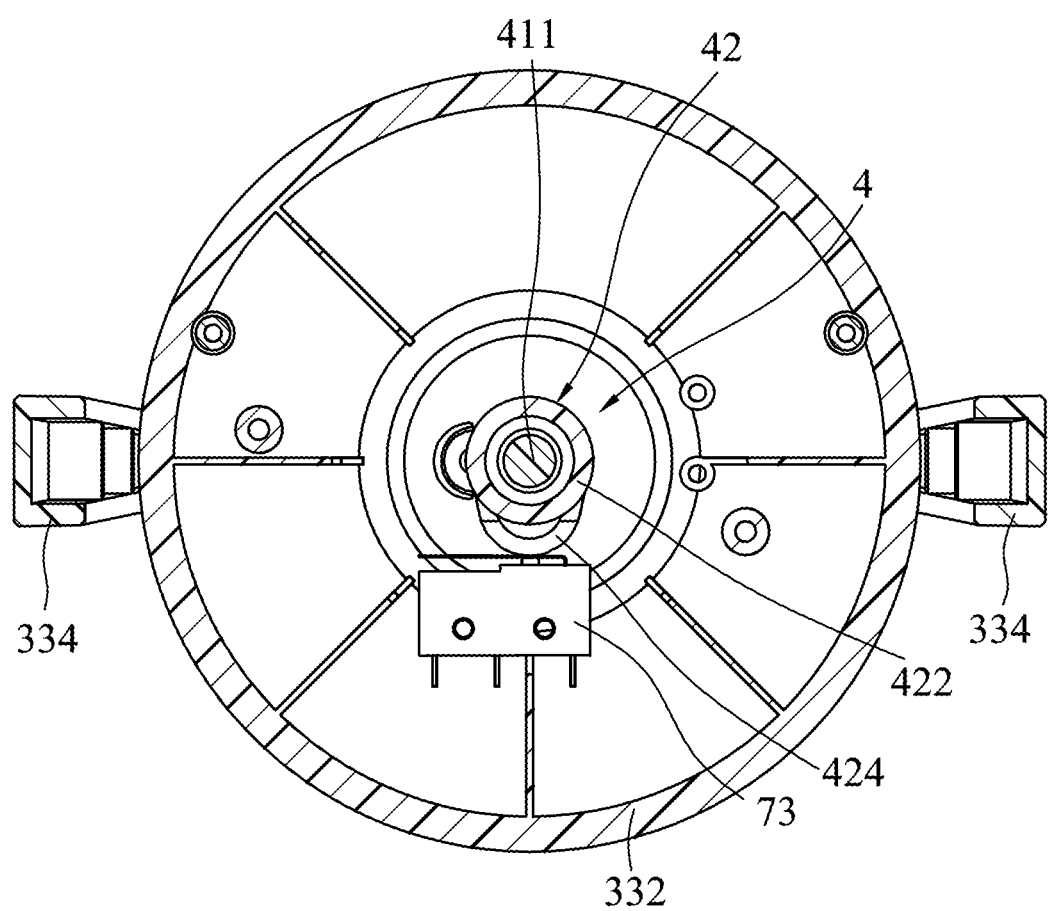
FIG. 21 is a cross-sectional view of the third embodiment, illustrating a state that the contact portion contacts the positioning switch.

With reference to FIGS. 14, 20 and 21, the positioning switch 73 is in signal connection with both the contact switch 721 and the motor 41 to control operation of the motor 41. During the rotation of the eccentric member 42 and the fluid delivering member 51 by the driving shaft 411 of the motor 41, the contact portion 424 is moved to be spaced apart from the positioning switch 73 (as shown in FIG. 20) or to contact to switch-on the positioning switch 73 (as shown in FIG. 21). Under the rotating delivering mode, owing to restriction by the contact switch 721, the positioning switch 73 is in an idle position even when the contact portion 424 contacts the positioning switch 73. Namely, the positioning switch 73 is actuated only when the control unit 7 is shifted to the vertical delivering mode.

With reference to FIGS. 17 to 19, when the control unit 7 is in the rotating delivering mode (as shown in FIG. 19), fluid can be introduced upwardly in the stationary valve member 712 through the central inlet port 715, and flows downwardly through the first pipe 61 through the communication groove 719 and the first inlet port 716. The fluid then flows in the nozzle assembly 512 through the second tubular member 552 and the fluid chamber 56, and is delivered from the nozzle assembly 512 during rotation of the fluid delivering member 51 as mentioned above and shown in FIGS. 17 and 18.

Figure 22:
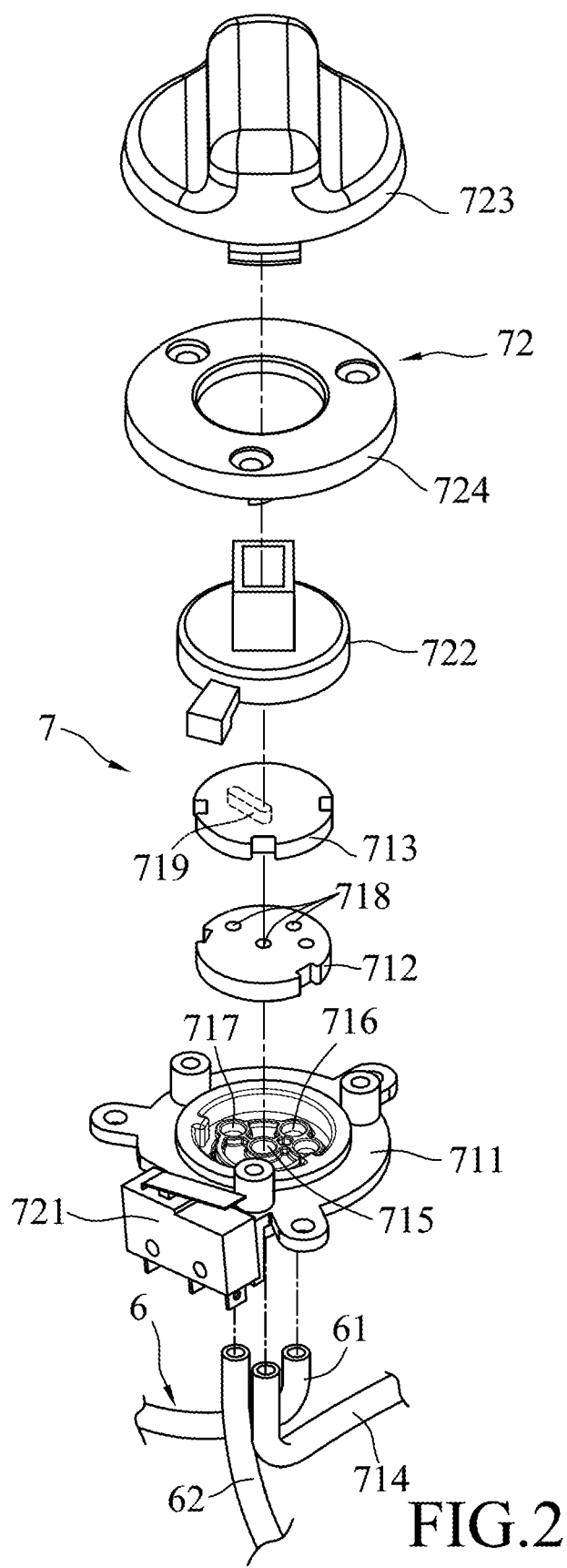
FIG. 22 is an exploded perspective view of the control unit in a vertical delivering mode.

With reference to FIGS. 14, 19 and 22, when the rotary knob 723 is turned counterclockwise from the state of FIGS. 14 and 19 to the state of FIG. 22, the control unit 7 is shifted to the vertical delivering mode. In this mode, the shift member 722 is rotated to press the contact switch 721 to actuate the positioning switch 73, and the movable valve member 713 is moved to generate fluid communication of the communication groove 719 with the second inlet port 717.

With reference to FIGS. 17, 20 and 21, in the vertical delivering mode, the contact portion 424 of the eccentric member 42 is shifted from the state of FIG. 20, where the contact portion 424 is spaced apart from the positioning switch 73, to the state of FIG. 21, where the contact portion 424 contacts the positioning switch 73, and the motor 41 is stopped to keep the eccentric member 42 in the state of FIG. 21 and the fluid delivering member in the state of FIG. 17. At this time, fluid introduced in the fluid control module 71 from the fluid supply pipe 714 can flow in the second pipe 62 through the fluid control module 71. The fluid then flows in the vertical delivering channel 544 through the first tubular member 543, and is delivered vertically from the vertical delivering channel 544.

In this embodiment, the fluid pourover device can perform rotating and vertical deliveries. With the control unit 7 operable to control the flow path of the fluid, and rotation or positioning of the fluid delivering member 51, the fluid pourover device of this embodiment can be readily shifted between the rotating delivering mode and the vertical delivering mode for suiting different brewing requirements.

The fluid pourover device of the third embodiment can be used in a fluid pourover method. In addition to the steps that mentioned above, the method further includes the step (d) of operating the fluid pourover device to deliver the fluid from the fluid delivering member 51 in the upright direction.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A fluid pourover device for brewing a beverage comprising:
    a driving unit defining a rotating axis that extends in an upright direction;
    a fluid delivering unit comprising
    a transmitting shaft which extends along a transmitting axis that is inclined relative to and intersects the rotating axis by an included angle and which is coupled with said driving unit to be rotated about the rotating axis, and
    a fluid delivering member which is connected with and extends downwardly and along the transmitting axis from said transmitting shaft to terminate at a nozzle forming portion, said nozzle forming portion having a nozzle assembly which is configured to define at least one fluid delivering path of a column of a fluid that is inclined relative to the upright direction; and
    a fluid supply unit for supplying the fluid to said fluid delivering member,
    said driving unit comprising, a motor and an eccentric member which is driven by said motor to rotate about the rotating axis, said eccentric member having an eccentric portion which is offset from the rotating axis and is engaged with said transmitting shaft to keep an inclined rotation of said fluid delivering member relative to the rotating axis.

2. The fluid pourover device as claimed in claim 1, wherein said transmitting shaft has an upper shaft end which is connected with said eccentric portion of said driving unit and offsets from the rotating axis to keep the inclined rotation of said fluid delivering member relative to the rotating axis so as to bring the fluid delivering path inclined relative to the rotating axis.

3. The fluid pourover device as claimed in claim 2, wherein the rotating axis intersects the transmitting axis at an intersecting point, said fluid delivering unit being supported at the intersecting point as a fulcrum to be moved around the rotating axis relative to the intersecting point.

4. The fluid pourover device as claimed in claim 1, wherein said fluid delivering member is configured to form the fluid delivering path in a conical shape during an inclined rotation of said fluid delivering member.

5. The fluid pourover device as claimed in claim 1, wherein said nozzle assembly has a plurality of nozzles formed through said nozzle forming portion and spaced apart from each other to respectively define the fluid delivering paths.

6. The fluid pourover device as claimed in claim 1, wherein the included angle ranges from 10 degrees to 30 degrees.

7. The fluid pourover device as claimed in claim 6, wherein the included angle is 20 degrees.

8. The fluid pourover device as claimed in claim 1, wherein said fluid delivering member has a vertical delivering channel which extends through said nozzle forming portion in the upright direction to define a vertical flowing path.

9. The fluid pourover device as claimed in claim 8, wherein said fluid delivering member has a lower seat disposed normal to the transmitting axis, said lower seat having a lower wall which serves as said nozzle forming portion, and a tubular wall which extends downwardly from said lower wall and which cooperates with said lower wall to define therein said vertical delivering channel, said fluid pourover device further comprising a control unit which is coupled with said driving unit to be operatively shiftable between a rotating delivering mode, where said driving unit is actuated to rotate said fluid delivering unit and to permit the fluid to be delivered from said nozzle assembly, and a vertical delivering mode, where said driving unit is stopped and to permit the fluid to be delivered from said vertical delivering channel.

10. The fluid pourover device as claimed in claim 9, wherein said lower seat has a first tubular member which extends upwardly from said lower wall and which is connected with said tubular wall to be in fluid communication with said vertical delivering channel, said fluid delivering member further having an upper seat which is spaced apart from said lower seat in a direction of the transmitting axis and on which said transmitting shaft is disposed, and a middle seat which is interposed between said upper and lower seats, said upper seat having two inlet ports, said middle seat having a base wall which is disposed normal to the transmitting axis and which cooperates with said lower seat to define a fluid chamber that is in fluid communication with said nozzle assembly, and a second tubular member which extends upwardly from said base wall and which is in fluid communication with said fluid chamber, said fluid supply unit including first and second pipes which are connected and in fluid communication with said second and first tubular members, respectively.

11. The fluid pourover device as claimed in claim 10, wherein said control unit includes a mode shift module which is operable by a user to be shifted between the rotating and vertical delivering modes, a fluid control module which is coupled with said fluid supply unit and which is driven by said mode shift module to permit flow of fluid into one of said first and second pipes in accordance with a selected one of the rotating and vertical delivering modes, and a positioning switch which is in signal connection with said driving unit such that, when said mode shift module is shifted to the rotating delivering mode, said fluid control module controls the flow of fluid into said first pipe so as to deliver the fluid from said nozzle assembly, and such that, when said mode shift module is shifted to the vertical delivering mode, said driving unit contacts said positioning switch to be stopped to retain said fluid delivering member with said vertical delivering channel extending in the upright direction, and said fluid control module controls the flow of fluid into said second pipe so as to deliver the fluid from said vertical delivering channel.

12. The fluid pourover device as claimed in claim 11, wherein said positioning switch is in signal connection with said mode shift module such that, when said mode shift module is in the rotating delivering mode, said positioning switch is in an idle position, and such that, when said mode shift module is in the vertical delivering mode, said driving unit contacts said positioning switch to be stopped.

* * * * *